Patented Sept. 28, 1943

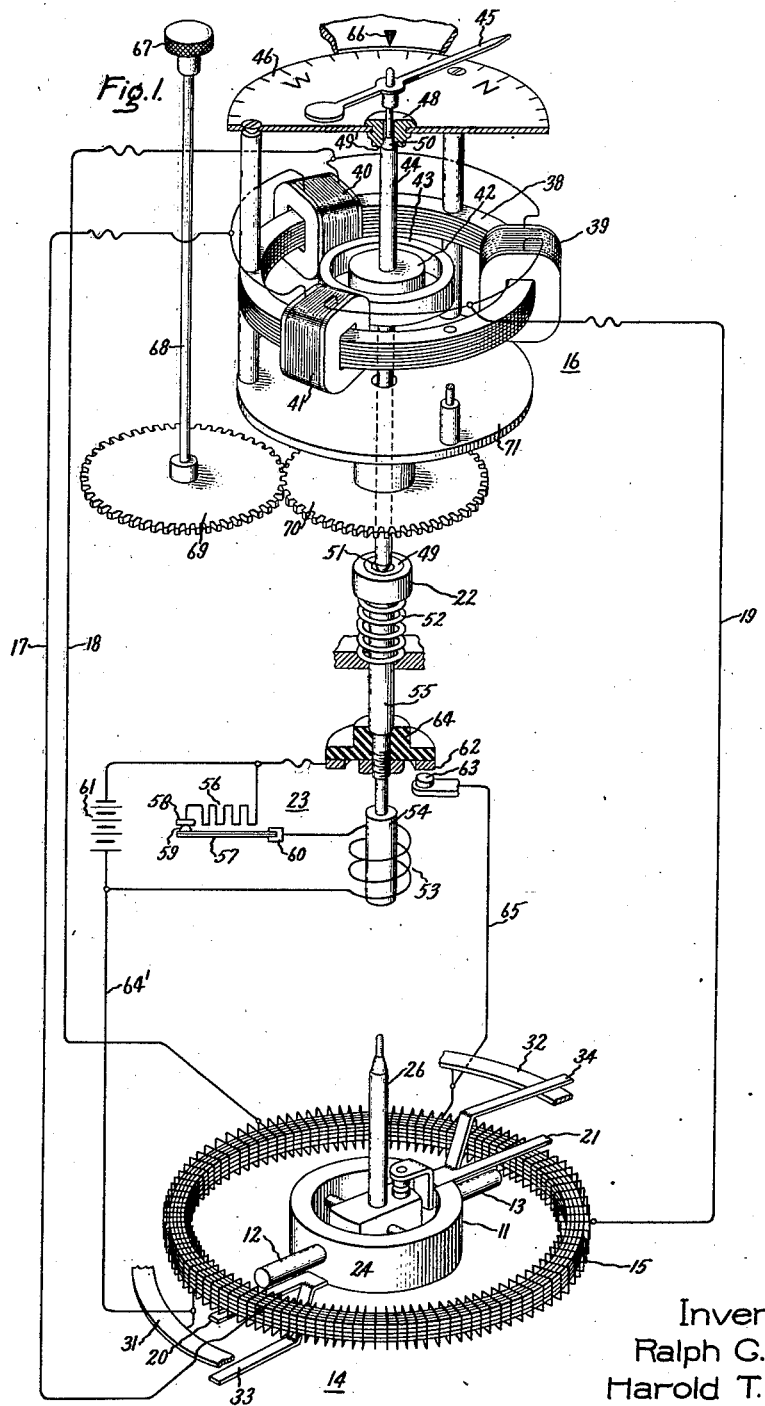

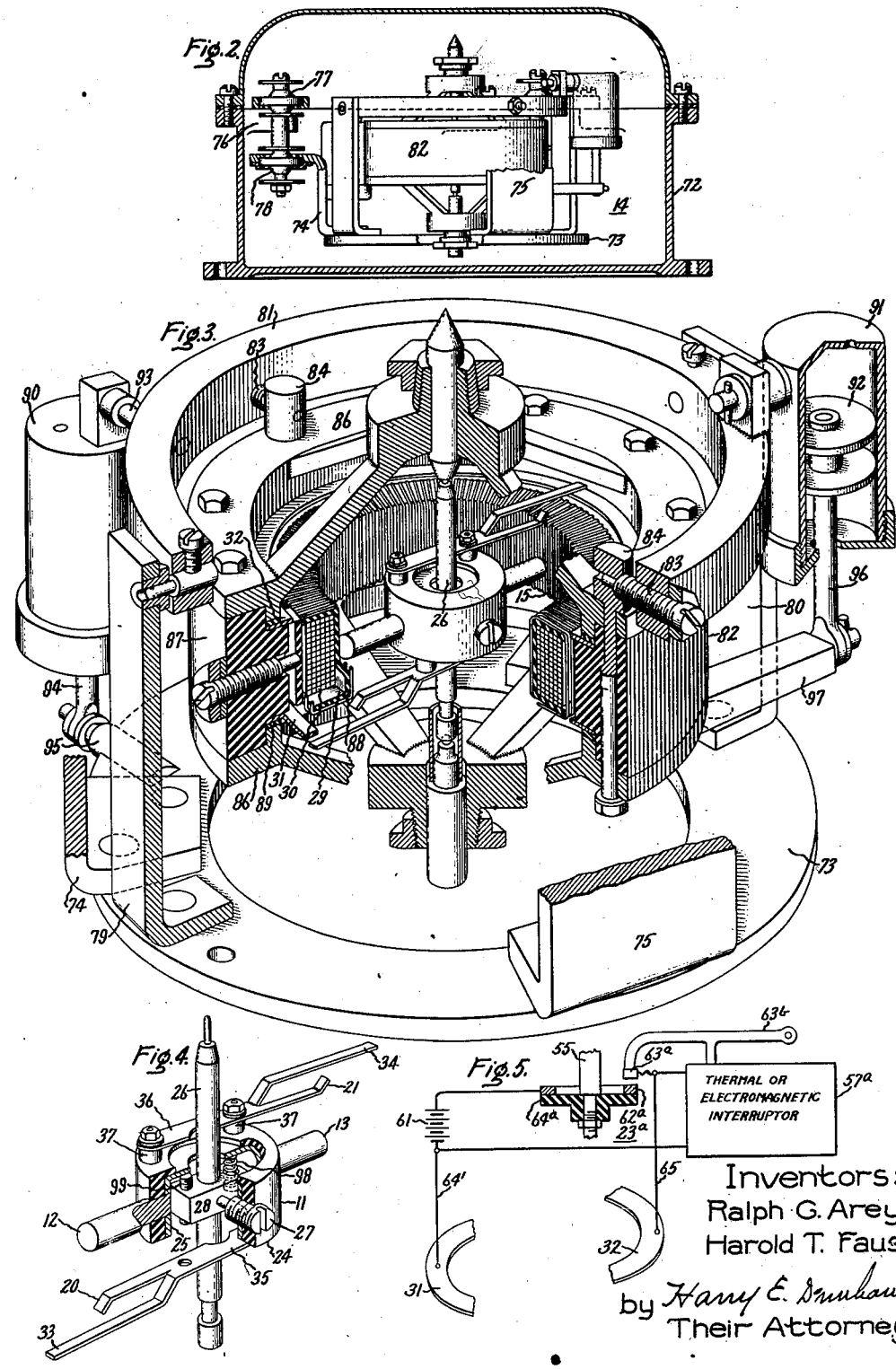

2,330,661

UNITED STATES PATENT OFFICE 2,330,661

TELEMETERING ARRANGEMENT

Ralph G. Arey, Swampscott, and Harold T. Faus, Lynn, Mass., assignors to General Electric Company, a corporation of New York Application November 7, 1941, Serial No. 418,212

7 Claims. (Cl. 33—222)

Our invention relates to telemetering arrangements and concerns particularly remote indicating compasses.

It is an object of our invention to provide arrangements for accurately transmitting the indication of a delicately pivoted sensitive compass needle without imposing any restraining force thereon which would deter it from freely assuming its position in alignment with the earth's magnetic field.

It is also an object of our invention to provide improved arrangements for transmitting angular positions in general and utilizing direct current energization. Other and further objects and advantages will become apparent as the description proceeds.

In carrying out our invention in its preferred form we utilize the remote position indicating or telemetering principle of the apparatus described in Patent No. 2,248,616, Faus, in which there is a toroidally wound transmitter resistor element and a receiver element with an annular core carrying electrical windings tapped at three points and connected to corresponding points on the transmitter resistor. The transmitter of the Faus patent has rotatable contacts energized with direct current and the contacts make contact with diametrically opposite points on the transmitter resistor. The receiver has a permanent magnet rotor carrying an indicating pointer which is deflected angularly by rotation of the resultant magnetic field at the receiver produced by variations in the current distribution in the transmitter resistor and in the receiver windings produced by rotation of the contacts at the transmitter.

In our remote indicating compass we utilize a rotatable compass needle or an equivalent system of magnetized bars carrying a pair of contacts adapted to be brought into electrical connection with diametrically opposite points of a transmitter resistor but not normally in engagement therewith in order to eliminate any frictional load on the compass needle system. We provide a mechanism for intermittently bringing the transmitter contacts into electrical engagement with the transmitter resistor at whatever angular position the compass needle system has at the time with respect to the transmitter resistor and simultaneously energizing the contacts so that the indicating pointer at the receiver takes up the angular position of the compass needle. We provide mechanism also for normally holding the receiver indicator pointer in its last assumed position and freeing the receiver pointer simultaneously with producing the electrical engagement between the transmitter contacts and the transmitter resistor. The intermittent energization of the electrical system takes place at a sufficiently high frequency so that relatively little change in orientation of the craft on which the remote indicating compass is mounted can take place in the interval.

A better understanding of our invention will be afforded by the following detailed description considered in connection with the accompanying drawings, and those features of the invention which are believed to be novel and patentable will be pointed out in the claims appended hereto.

In the drawings, Fig. 1 is a schematic diagram in perspective and partially in section illustrating an embodiment of our invention; Fig. 2 is a plan view of a transmitter unit for a remote indicating compass of the type represented schematically in Fig. 1; Fig. 3 is a perspective view with certain parts broken away or shown in section illustrating the transmitter unit of Fig. 2; Fig. 4 is a detailed view, with certain additional parts broken away or shown in section, of the mounting arrangement for the movable element of the transmitter shown in Fig. 3, and Fig. 5 is a fragmentary view of a modification in the arrangement of Fig. 1 with a different form of interrupting device. Like reference characters are utilized throughout the drawings to designate like parts.

As shown in Fig. 1 our remote indicating system comprises a compass needle means or a system of compass needles 11 including two bar magnets 12 and 13 rotatably mounted about a substantially vertical axis forming a part of a transmitter 14 including also a toroidal transmitter resistor 15, and a receiver 16 electrically connected to the transmitter resistor 15 by conductors 17, 18 and 19. The rotatable element or compass needle system 11 of the transmitter 14 includes contacts 20 and 21 adapted to be brought into contact intermittently with diametrically opposite points in the transmitter resistor 15. The receiver 16 is provided with a spring pressed normally tight lower bearing 22 for holding the indication at the angular position last attained and means for intermittently freeing the bearing 22 to allow the receiver indication to conform to the angular position of the compass needle system 11 at the transmitter 14. An intermittent contactor system 23 is provided for simultaneously energizing the transmitter contacts 20 and 21, bringing them into electrical engagement with the transmitter resistor 15, and freeing the tight bearing 22 of the receiver 16.

The rotatable compass needle system 11 may take any desired form and may, for example, be of the type disclosed in Patent No. 2,003,179, Faus, in which a rotatable element carries a plurality of relatively short magnetized bars composed of high coercive force magnetic material, and the pivot axis is surrounded by a damping cup or ring of electrically conducting material. As shown in Figs. 1, 3 and 4 of the present application the compass needle system 11 comprises a hublike member or cylindrical shell 24 surrounding an open cuplike yoke member 25, which is composed of relatively permeable magnetic material such as certain nickel-iron alloys. The bar magnets 12 and 13, composed of a high coercive force permanent magnet material, such as aluminum-nickel cobalt alloy for example, make magnetic contact with the yoke member 25 and a rotatable spindle 26 having a vertical pivot axis is provided for supporting the hublike member 24. The hublike member 24 is so mounted on the spindle 26 as to permit the compass bars 12 and 13 to be tilted out of the horizontal plane. For example, a pair of studs 27 threaded into the hub 24 may be pivoted to a block 28 rigidly secured to the spindle 26. A damping cup (not shown in Figs. 1 and 4) is formed by a copper shell 29 (Fig. 3) serving also as a part of a winding form of the transmitter.

The compass needle system 11, shown in detail in Fig. 4, forms the rotatable element of the transmitter 14. The stationary element of the transmitter 14 comprises the toroidal resistor 15 already mentioned, an arrangement for intermittently bringing the contacts 20 and 21 into electrical engagement with the resistor 15 and connections for applying electrical current through the contacts 20 and 21. The contacts 20 and 21 are so positioned that, when the compass needles 12 and 13 are in their normally horizontal position in the plane of the toroidal resistor 15 which is normally also horizontal, there will be a slight axial or vertical spacing between the contacts 20 and 21 and the adjacent portions of the resistor 15. If both contacts 20 and 21 are arranged either above or below the resistor 15, the mechanism for producing the electrical engagement takes the form of a device for raising or lowering the movable element 11. However, in the form illustrated in the drawings one of the contacts 21 is above the resistor 15 and the other contact 20 is below the resistor 15 and electrical engagement of the contacts of the resistor 15 is effected intermittently by tilting the movable element 11. The tilting mechanism takes the form of a circular current-conducting coil 30 around which the toroidal resistor 15 is wound, but of course from which it is electrically insulated.

The same means utilized for electrically energizing the contacts 20 and 21 is utilized for intermittently passing current through the contact-producing coil 30 to react electromagnetically upon the magnetized bars 12 and 13 and to tilt the movable element 11. Electrical connection to the ends of the coil 30 is made from a pair of contact rings 31 and 32 mounted below and above the toroidal resistor 15. The movable element 11 carries also a pair of contacts 33 and 34 which are adapted to make electrical contact with the contact rings 31 and 32, respectively, when the movable element is tilted. The contacts 33 and 34 are positioned slightly further from the contact rings 31 and 32 than the contacts 20 and 21 are from the resistor 15. All four contacts are composed of resilient electrical conducting material. Consequently, when the movable element 11 is tilted, electrical contact is not made with the contact rings 31 and 32 until contact has been made with the resistor 15 in order to avoid sparking at the surfaces of the resistor 15.

As shown in the drawings, the contacts 20 and 33 are electrically connected and the contacts 21 and 34 are electrically connected. For example, each such pair of electrically connected contacts may be formed from the same sheet of spring brass stamped and bent to the shape shown. For example, a metallic sheet may be cut and stamped to form a piece 35 including ends forming contacts 20 and 33 and a similar piece 36 may be formed having ends forming the contacts 21 and 34. The pieces 35 and 36 are mounted on the hublike member 24 and electrically insulated therefrom. For example, the member 24 may be composed of insulating material, or the pieces 35 and 36 may be secured thereto by suitable insulating means such as screws composed of insulating material and insulating spacers 37.

The receiver 16 may include basic elements similar to those shown in the aforesaid Patent No. 2,248,616, Faus, particularly in Fig. 4 of the said Faus patent. Such a receiver includes an annular core 38 composed of low hysteresis alloy rings carrying either a toroidal winding or these three compact coils 39, 40 and 41 connected in series with the three junction points electrically connected to the conductors 17, 18 and 19, which extend between the transmitter 14 and the receiver 16. There is a rotor 42 composed of high coercive force material, for example, sintered magnetic oxides formed into a cylinder and magnetized transversely. For damping out oscillations, a damping ring 43 may be provided. The rotor 42 is carried by a rotatable spindle 44 to which is attached a pointer 45 adapted to cooperate with a scale or dial plate 46 which may be graduated in terms of the points of the compass.

The spindle 44 of the receiver rotor is mounted between an upper bearing 48 and a lower bearing 49 which may be in the form of a cup-shaped jewel such as that used on watthour meters, for example, as described in Patents No. 2,041,601, Goss, and 2,229,969, Goss.

In the vertical axis type of receiver illustrated the upper bearing 48 has a conical seat 49' and the spindle 44 has a conical shoulder near the upper end to cooperate with the conical seat of the upper bearing 48. The lower end of the spindle 44 is shown as being in the form of a conventional conical pivot 51 adapted to cooperate with the cup-shaped jewel 49. The jewel 49 forming the lower bearing is carried by the lower bearing housing 22. As already explained, in order to provide for normally holding the spindle 44 in fixed position and for intermittently freeing it, the lower bearing housing 22 is axially movable being resiliently biased upward by means of a compression spring 52 which serves to drive the spindle 44 upward and to hold the conical shoulder 50 against the conical bearing seat 49' with sufficient force to hold the spindle 44 frictionally against rotation. For releasing the lower bearing housing 22 intermittently a solenoid 53 and a plunger 54 are provided. The bearing housing is formed with a downwardly extending portion 55 to the end of which the magnetic plunger 54 is secured. The intermittent contacting arrangement 23 serves to energize coil 53 intermittently and thus to draw the plunger 54 downwardly intermittently to release the bearing housing 22.

It will be understood that for receivers with horizontal axes, instead of vertical axes, bearings suitable for receivers in the horizontal position would be employed, for example, bearings of the conventional ringstone endstone type would be employed in place of cup jewels and conical pivots.

Any suitable form of intermittent contacting arrangement may be employed. The form illustrated in the drawings consists of a current-conducting resistance heater 56, a bimetallic strip 57 adapted to be subjected to the heating effect of the heater 56, a stationary contact 58 and a movable contact 59 carried at one end of the bimetallic strip 57. The other end of the bimetallic strip 57 is supported by a stationary block 60. A suitable source of energizing current, such as a battery of cells 61, is provided. The heater 56 is connected in series with the switch-forming contacts 58 and 59, the bimetallic strip 57 and the solenoid coil 53 across the current source 61. The bimetallic strip 57 is arranged with a metal of greater expansibility on the side toward the stationary contact 58, which is so positioned that when the strip 57 is cool the circuit is closed with the contacts 58 and 59 together. Accordingly, whenever the contacts 58 and 59 are closed, current from the source 61 flows through the bimetallic strip 57 heating it to cause greater expansion on the side toward the stationary contact 58, thus bending the strip 57 and opening the electrical circuit through the solenoid 53 by separating the contacts 58 and 59. The opening of the electrical circuit allows the heater 56 to cool and the bimetallic strip 57 resumes its original position to close the electrical circuit, energize the solenoid 53 and draw down the plunger 54. The successful operation of the apparatus is not limited to a precise contact frequency. However, satisfactory performance has been obtained with three contacts a second.

The contacting arrangement 23 includes also a movable contact 62, and a stationary contact 63 for intermittently energizing the transmitter. In the form of apparatus shown the movable contact 62 is secured to an insulating flange 64 carried by the extending portion 55 of the bearing housing 22 so that the movable contact 62 is moved in response to energization of the solenoid 53 to close the electrical circuit through the source 61 to the contacts 62 and 63. One side of the source 61 is connected through a conductor 64' to the contact ring 31 of the transmitter and the other side of the source 61 is connected to the movable contact 62, the stationary contact 63 being connected through a conductor 65 to the second contact ring 32 of the transmitter.

For perfectly synchronizing the freeing of the moving element of the receiver with the energization of the transmitter, a modified form of interrupting or contacting mechanism may be employed as shown in Fig. 5, in which the contact pressure between contacts corresponding to the contacts 62 and 63 of Fig. 1 serves also to release the tight bearing of the receiver, or to release a braking device which normally binds or brakes the movable element of the receiver.

As illustrated in Fig. 5, a contacting mechanism 23a is provided which includes a movable contact 62a carried by a member 64a corresponding to the insulating bushing 64 of Fig. 1, but inverted. For cooperating with the movable contact 62a, there is a second movable contact 63a which is carried by a hinged arm 63b and is operated by a suitable electrically energized interrupting mechanism such as a thermal or electromagnetic interrupter 57a corresponding to the bimetallic strip 57 of Fig. 1. The transmitter contact rings 31 and 32 are connected to the current source 61 in series with the switch formed by the contacts 62a and 63a by means of conductors 64' and 65 in Fig. 1. The contacts 58 and 59 of Fig. 1 are eliminated and the thermal or electromagnetic interrupter 57a is connected in series with the switch formed by the contacts 62a and 63a to the current source 61. The interrupter 57a is so arranged that in a normal or deenergized position, to which it is biased, it holds the arm 63b down, whereby the contacts 62a and 63a are closed. In the energized position the interrupter 57a drives the arm 63b upwards to open the contacts 62a and 63a. Accordingly, the arm 63b is drawn downward intermittently and as the movable contact 63a strikes the contact 62a it simultaneously closes the energizing circuit to the transmitter and moves the bearing extension 55 downward to free the movable element of the receiver.

From the foregoing description it will be understood that the intermittent closing of the electrical circuit to the current source 61 by the contacting mechanism 23 causes the bearing housing 22 to be released simultaneously with the energization of the contact rings 31 and 32 of the transmitter. Consequently, while the bearing housing 22 of the receiver is released and the transmitter is energized, the spindle 44 of the receiver is permitted to rotate freely, and energization of the transmitter causes magnetic flux to be produced in the receiver which has an angular direction determined by the orientation of the transmitter and thus brings the receiver pointer 45 in alignment with the compass needle system 11 of the transmitter. When voltage appears between the transmitter contact rings 31 and 32 by reason of the action just mentioned the tilting coil 30 is energized and tilts the movable element 11 of the transmitter. Accordingly electrical contact is made between the energized contact rings 31 and 32 and two points on the transmitter resistor 15.

The portions of the transmitter resistor 15 contacted depend upon the orientation of the craft carrying the resistor 15, that is, upon the relative angular positions of the resistor 15 and the movable element 11. Accordingly two parallel paths through the resistor 15 are formed. The relative resistances from the contacts 20 and 21 to the taps at which the conductors 17, 18 and 19 are connected depend upon the relative angular position of the contacts and the resistor 15. Currents are passed also through the receiver coils 39, 40 and 41 of relative magnitudes depending upon the relative angular position of the transmitter contacts 20 and 21 and the transmitter resistor 15. The receiver coils 39, 40 and 41 produce a resultant magnetic field which passes diametrically across the receiver core 38 and the angular position of this diametrical field depends upon the relative magnitudes of the currents in the receiver coils 39, 40 and 41. The rotor 42 thus is brought into alignment with the diametrical magnetic field as explained more in detail in Faus Patent No. 2,248,616.

As soon as the electrical circuits are broken between the contacts 58 and 59 and between the contacts 62 and 63, the compass needle system 11 is freed from the frictional restraint of the engagement of the contacts 20 and 21 with the resistor 15 and is thus free to remain in alignment with the earth's magnetic field in case orientation of the resistor 15 and the craft should change. At the same time the receiver spindle 44 is raised by the spring 52 to preserve the indication produced.

If desired, the stator of the receiver 16 including the core 38 and the dial plate 46 may be made adjustable in angular position for the purpose of course setting. A stationary course setting index 66 may be provided, which is adapted to cooperate with the scale markings of the dial 46. For the purpose of setting a desired course, a setting knob 67 may be provided which is arranged to adjust the angular position of the receiver stator by any suitable linkage. For example, the knob 67 may be carried by a shaft 68 connected to a gear 69 meshing with a second gear 70 connected to a plate 71 carrying the stator of the receiver 16, that is, carrying the core 38, the coils 39, 40 and 41 and the dial plate 46. It will be understood that the course setting feature is used by setting the dial plate 46 to the desired course and then steering the ship or airplane in such a manner as to keep the pointer 45 on the index 66.

Although the apparatus has been described and shown as a remote indicating compass, it is to be observed that the invention is not limited thereto. The system serves also for reproducing at a distance the angular portion of the transmitter spindle 26 if the spindle is rotated by a handle or is linked to other movable apparatus, the angular position of which is to be indicated at a distance. In this case the transmitter or the rotatable portion thereof may be surrounded by a suitable soft iron shield ring or housing to overcome or minimize the effect of the earth's magnetic field without making the contact-producing coil 30 ineffective. For compactness the tilting coil and transmitter resistor are superposed but our invention it not limited to this specific arrangement.

Although we have described our invention in connection with its use for visual direction indication and visual course maintenance, illustrating a form of the invention suitable for this purpose, it will be understood that our invention is not limited thereto and does not exclude the use of a contact-making pointer in place of the simple indicating pointer 45 with a pair of contacts on either side of the course setting index 66 or with equivalent means well known to those skilled in the art for controlling the operation of steering engines or the like in one direction or the other according to the direction of deviation of the pointer 45 from the course-setting index 66.

In Fig. 2 we have shown the transmitter 14 of Fig. 1 mounted within a protecting casing 72. If desired a suitable magnetic compensator such as that disclosed in Patent No. 1,968,556, Innes, for example, may be mounted on or in the casing 72 to compensate for magnetic effects produced by the hull or other machinery on the ship or aircraft on which the remote indicating compass in installed. To allow for pitch and roll or bank and glide of the ship or aircraft on which the compass is installed a gimbal mounting for the transmitter 14 is preferably provided which may take the form illustrated in Figs. 2 and 3. In the mechanism illustrated a main supporting ring 73 is provided having three supporting brackets, two of which, 74 and 75, are visible, which are suspended from lugs 76 projecting inwardly from the protective casing 72. For the purpose of absorbing vibration, suitable resilient members 77 and 78 may be interposed in the suspension between the transmitter supporting brackets 74 and 75 and the lugs 76.

Extending upwardly from the main supporting ring 73 are two posts 79 and 80 to the upper ends of which a gimbal ring 81 is pivoted. A transmitter frame 82 is in turn pivoted to the gimbal ring 81 along a pivot axis transverse to the pivot axis of the gimbal ring 81, for example, by means of bolts 83 projecting through the gimbal ring 81 into suitable projections 84 carried by the transmitter frame 82.

The transmitter frame 82 consists of a pair of spiders 86 between which a ring 87 of insulating material is bolted. The spiders 86 carry suitable bearings for rotatably supporting the transmitter spindle 26 which is formed to have conventional pivots at the upper and lower ends. If desired, the bearing arrangement may resemble that of Patent No. 2,229,969, Goss. The electrical windings of the transmitter are supported within the insulating ring 87. A dual function winding form may be provided consisting of a spool having a channel-shaped cross-section composed of the copper shell 29, already mentioned, carrying an insulating coating 88. The tilting coil 30 is wound in a conventional manner upon the spool 29 and the resistor 15 consists of wire wound toroidally around the insulating coating 88 of the spool 29. The winding 30 is of course composed of insulated wire and the wire of the resistor coil 15 may either be insulated or uncoated wire as preferred. However, if insulated wire is employed, the portions thereof intended to make contact with the contacts 20 and 21 are freed from insulation. The great compactness of the construction will be apparent from the fact that the spool 29 serves simultaneously as a damping ring for the magnet bars 12 and 13, a winding form for the automatic tilting coil 30 and a winding form for the toroidal resistor 15. It will be understood that flexible electrical connections are brought out from three points on the toroidal resistor 15 and from the contact rings 31 and 32. The five connections to be brought out are represented in Fig. 1 viz.: 17, 18, 19, 64 and 65. It will be observed that the contact rings 31 and 32 are clamped between the insulating ring 87 and the top and bottom spiders 86 with suitable insulating washers 89 interposed.

For damping the relative motion of the transmitter housing 82 and a protective casing 72, damping cylinders 90 and 91 cooperating with suitable pistons may be provided. The damping cylinder 91 is broken away in part to expose the piston 92 which cooperates with it. The cylinder 90 and its cooperating piston dampen oscillation of the gimbal ring 81 with respect to the supporting ring 73 and the cylinder 91 serves to dampen the oscillation of the transmitter housing 82 with respect to the gimbal ring 81. As shown in the drawing the cylinder 90 is pivotally secured to the gimbal ring 81 by a stud shaft 93 and the piston rod 94 of the cylinder 90 is pivotally secured to a stud shaft 95 on the supporting ring 73. Similarly the cylinder 91 is pivotally secured to the gimbal ring 81 and the piston rod 96 of the piston 92 is pivotally secured to an arm 97 secured to and projecting from the housing 82. In the form illustrated the damping cylinders are of the air damping type.

As shown in Fig. 4 means are provided to prevent inadvertent engagement of the contacts 20 and 21 with the toroidal resistor 15 when the electrical circuits are not energized. This means may take the form of a compression spring 98 having one end fitted in a socket in the block 28 carried by the transmitter spindle 26 and having the other end bearing against the inside surface of the top portion of the cup 25. An adjusting screw 99 adapted to project upwardly from the other end of the block 28 is provided to adjust the normal spacing between the contacts 20, 21, 33 and 34 and the elements with which they are brought into engagement when the electrical circuits are energized.

We have herein shown and particularly described certain embodiments of our invention and certain methods of operation embraced therein for the purpose of explaining its principle and showing its application, but it will be obvious to those skilled in the art that many modifications and variations are possible, and we aim therefore to cover all such modifications and variations as fall within the scope of our invention which are defined in the appended claims.

What we claim as new and desire to secure by Letters Patent of the United States is:

1. A transmitter for a remote position-indicating system comprising a hollow center spool with a channel-shaped cross-section, a tilting coil wound circularly in the channel portion of the spool, a resistor coil wound toroidally around the spool so as to be wrapped around the tilting coil, said coils being insulated from each other, a magnetic needle system rotatable about an axis substantially coaxial with said coils and also rotatable about an axis transverse thereto whereby the magnetic needle system is adapted to rotate in response to the effect of relative variations in the direction of magnetic field and is adapted to tilt in response to energization of the tilting coil, said magnetic needle means carrying contacting mechanism normally spaced from the toroidal resistor coil and brought into contact therewith by tilting of the magnetic needle means.

2. A remote indicating compass comprising magnetic needle means normally rotatable in a plane about a normal axis with a mounting providing for movement with respect to a second axis so as to deflect out of said plane, a needle tilting coil located in inductive relation to the magnetic needle means having a magnetic axis transverse to said plane, for deflecting the magnetic needle means with respect to its second axis, a telemetering channel responsive to the angular position of the magnetic needle means with respect to its normal axis, said telemetering channel having circuits including normally open contacts spaced apart to render the telemetering channel ineffective when the magnetic needle means is in a normal position with respect to its second axis and adapted to be closed when the magnetic needle means is deflected with respect to its second axis for completing the circuits of the telemetering channel and making it effective.

3. Apparatus such as set forth in claim 2 including a single intermittent electric energizing mechanism for simultaneously energizing both the needle tilting coil and the telemetering channel.

4. An intermittently operating remote indicating compass comprising a rotatable spindle, a relatively permeable magnetic yoke pivotally mounted on said spindle to provide for deflection about an axis transverse to the spindle axis, magnetized bars carried by said yoke to form a compass needle system, a resilient restraining device for normally maintaining the magnetic bars at a fixed angle to the spindle, transmitter energizing contacts carried by the yoke and electrically insulated therefrom, and a mechanism for intermittently deflecting said bars with respect to the spindle for moving said contacts into energizing position.

5. A rotatable element for a transmitter in a remote position indicating system of the type in which electrical contacts are intermittently made in the transmitter for rendering the system effective but the contacting elements are normally separated for avoiding frictional drag on the rotatable element of the transmitter, comprising a circular impedance element and a rotatable element mounted for rotation on an axis concentric to the impedance element and having a rotatable spindle, a hub pivotally secured to said spindle with a pivot axis transverse to the spindle, a direction responsive device being connected to said hub and thus operatively connected to the spindle, a resilient element for normally maintaining the hub at a given angle to the spindle with respect to rotation about its pivot axis, and electrical contact means carried by the hub and extending therefrom in opposite directions transverse to the axis of the spindle whereby pivoting of the hub about its pivot axis serves to move the contact means in a direction for contact closing with said impedance at substantially diametrically opposite points thereof and rendering the telemetering system effective.

6. Apparatus for simultaneously mechanically releasing the movable element of an electrical instrument and electrically energizing the instrument, said apparatus comprising a binding or braking device having a movable member with braking and releasing positions and carrying a movable contact, a member for resiliently biasing the braking device to its braking position, an intermittently movable member with mechanism for alternately driving it in opposite directions, said latter member carrying an electrical contact adapted to cooperate with the first-mentioned electrical contact to form an instrument-energizing electrical switch adapted to be connected in series with a current source for energizing an electrical instrument, the second electrical contact and the said member for carrying the latter being so mounted with respect to the first-mentioned electrical contact and the member carrying it that the movement of the second contact against the first drives the first in the direction for releasing the braking device.

7. Apparatus such as set forth in claim 6 in which the mechanism for driving the second contact carrying member is an electro-responsive device normally in the contact-closing position and adapted to be moved to its contact-opening position when energized, said electro-responsive device being adapted to be connected in series with said contacts to the current source controlled by the contacts.

RALPH G. AREY.
HAROLD T. FAUS.